US000001451H

United States Statutory Invention Registration [19]

[11] Reg. Number: H1451

Campagnuolo

[43] Published: Jun. 6, 1995

[54] AUDIBLE EXPLOSIVE DEVICE SIMULATOR SYSTEM FOR MILES

[75] Inventor: Carl J. Campagnuolo, Potomac, Md.

[73] Assignee: The United States of America as represented by the Secretary of the Army, Washington, D.C.

[21] Appl. No.: 983,952

[22] Filed: Dec. 1, 1992

Related U.S. Application Data

[63] Continuation-in-part of Ser. No. 691,603, Apr. 18, 1991, Pat. No. 5,199,874.

[51] Int. Cl.[6] ..... F41A 33/00

[52] U.S. Cl. ..... 434/11; 434/16

[58] Field of Search ..... 434/11, 16; 340/384 R, 340/385; 364/578, 423; 102/407, 335; 446/401, 400, 404, 405, 473

[56] References Cited

U.S. PATENT DOCUMENTS

| | | | |
|---|---|---|---|
| 3,369,486 | 2/1968 | Wrennstad et al. | 102/64 |
| 3,941,058 | 3/1976 | Gawlick et al. | 102/64 |
| 4,319,426 | 3/1982 | Lee | 46/200 |
| 4,461,117 | 7/1984 | Gott | 446/473 |
| 4,802,675 | 2/1989 | Wong et al. | 446/473 |
| 4,926,159 | 5/1990 | Bartlett | 340/384 R |
| 5,074,793 | 12/1991 | Hambric et al. | 434/11 |
| 5,246,372 | 9/1993 | Campagnuolo et al. | 434/11 |

*Primary Examiner*—David Brown

*Attorney, Agent, or Firm*—Freda L. Krosnick; Frank J. Dynda; Muzio B. Roberto

[57] ABSTRACT

An acoustic training device for simulating the effects of a weapon posing an omnidirectional threat in a tactical engagement simulation system generates an audible signal of a predetermined frequency and duration once activated. The amplitude of the signal generated corresponds to the kill-zone of the weapon being simulated. The signal may be modulated so as to produce a predetermined number of pulses which are easily distinguished from other noises associated with the tactical exercise.

6 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

AUDIBLE EXPLOSIVE DEVICE SIMULATOR SYSTEM FOR MILES

RIGHTS OF THE GOVERNMENT

The invention described herein may be manufactured, used and licensed by or for the U.S. Government for Governmental purposes without payment to us of any royalty thereon.

This is a continuation-in-part of application Ser. No. 07/691,603, filed Apr. 18, 1991, now U.S. Pat. No. 5,199,874.

BACKGROUND OF THE INVENTION

1. Field of the Invention

The present invention relates generally to Multiple Integrated Laser Engagement System (MILES) type training devices and more particularly to an acoustic training device for simulating the effects of a weapon posing an omnidirectional threat in a tactical engagement simulation system such as the MILES.

2. Description of the Prior Art

The Multiple Integrated Laser Engagement System ("MILES") has revolutionized the way in which armies train for combat. MILES has been fielded with armies of many nations around the world and has become the international standard against which all other Tactical Engagement Simulation ("TES") systems are measured. For the U.S. Army and Marine Corps, MILES is the keystone for their opposing force, free-lay TES Program. It is highly valued in its ability to accurately assess battle outcomes and to teach soldiers the skills required to survive in combat and destroy the enemy.

With MILES, commanders at all levels can conduct opposing force free-play tactical engagement simulation training exercises which duplicate the lethality and stress of actual combat.

The MILES system uses laser bullets to simulate the lethality and realism of the modern tactical battlefield. Eye-safe Gallium Arsenide (GaAs) laser transmitters, capable of shooting pulses of coded infrared energy, simulate the effects of live ammunition. The transmitters are easily attached to and removed from all hand-carried and vehicle mounted direct fire weapons. Detectors located on opposing force troops and vehicles receive the coded laser pulses. MILES decoders then determine whether the target was hit by a weapon which could cause damage (hierarchy of weapons effects) and whether the laser bullet was accurate enough to cause a casualty. The target vehicles or troops are made instantly aware of the accuracy of the shot by means of audio alarms and visual displays, which can indicate either a hit or a near miss.

The coded infrared energy is received by silicon detectors located on the target. In the case of ground troops, the detectors are installed on webbing material which resembles the standard-issue load-carrying lift harness. Additional detectors are attached to a web band which fits on standard-issue helmets. For vehicles, the detectors are mounted on belts which easily attach to the front, rear, and sides. The detectors provide 360 degree coverage in azimuth and sufficient elevation coverage to receive the infrared energy during an air attack. The arriving pulses are sensed by detectors, amplified, and then compared to a threshold level. If the pulses exceed the threshold, a single bit is registered in the detection logic. Once a proper arrangement of bits exists, corresponding to a valid code for a particular weapon, the decoder decides whether the code is a near miss or a hit. If a hit is registered, a hierarchy decision is then made to determine if this type of weapon can indeed cause a kill against this particular target and, if so, what the probability of the kill might be.

While great success has been enjoyed with weapons that can be aimed there has been no convenient or economic way for the military to train with grenades that interact with the MILES system. This is because a grenade rotates during its ballistic flight path and would require several laser emitters so that at least one would be pointed at a target. However, even a large number of emitters would not assure a hit. Due to these difficulties, no grenade exists that interacts with the present MILES system. Consequently, there is a great need to find a way in which grenades and other ballistic or variable-directional flight path type weapons can be used in training exercises with MILES.

SUMMARY OF THE INVENTION

Accordingly, it is an object of the present invention to provide an acoustic indirect-fire training device for use in a tactical engagement simulating system which is responsive to acoustic signals.

It is another object of the present invention to provide an acoustic indirect-fire training device which emits an acoustic signal of sufficient intensity to indicate a hit in a tactical engagement system within a "kill zone" approximating that of the actual weapon being simulated.

It is still another object of the invention to provide an acoustic indirect-fire training device which emits an acoustic signal which is easily distinguished by a tactical engagement systems from other battlefield and ambient noises.

It is yet another object of the present invention is to provide an acoustic indirect-fire training device which resembles actual weaponry in appearance and use, but which can be thrown or otherwise used in combat simulation without causing injury to the players, and which can be immediately reused.

Another object of the present invention is to provide an acoustic indirect-fire training device which furnishes an intense visual signal to the players along with an acoustic signal.

The present invention achieves these objectives by using a predetermined acoustic signal to simulate an explosion in combination with receiver circuitry sensitive to the acoustic signal and operatively connected to the existing MILES power supply. A special feature presently incorporated in the MILES provides for an audible alarm to be activated upon removal and reinsertion of the MILES power source. This feature prevents someone from cheating by deactivating his MILES receiver during simulated combat. When the power source (typically a battery) is reinstalled an audible alarm is sounded. Consequently, by momentarily removing the MILES power source from the circuit for a brief instant and then reconnecting it back into the circuit the present invention is able to indicate a kill on MILES. This operation is performed when receiver circuitry detects a predetermined acoustic signal of sufficient amplitude and duration or can even be a coded acoustic signal. An acoustic signal overcomes the disadvantage of highly directional laser pulses because of its substantially omnidirectional propagation characteristics.

Consequently, a grenade, or other variable-directional explosive type device, that incorporates a sonic device or buzzer will be able to interact with the MILES that have been fitted with the present invention. The use of a pull pin and switch arrangement provides soldiers with a realistic grenade fop use in training operations. An optional "safety" lever pivotally attached to the grenade can be used to hold the switch open and provide realistic operation. A grenade that generates an audible signal is described in a copending application serial number: 07/008,923, entitled "TRAINING GRENADE" and is assigned to same assignee, the U.S. Government, as in this case.

The acoustic signal generated by the grenade is detected by receiver circuitry located and operatively connected to the power supply source for the MILES. The operational sequence of the simulator system is as follows. When a grenade is activated there is approximately a three second delay before a flash bulb fires. A flash may be used to provide a visual means for indicating that an explosion has occurred but, it is not essential. A delay is also advantageous so that the thrower does not activate his own received circuitry. After the flash fires a buzzer sounds for approximately three seconds. Obviously, other time periods may be selected. A means for detecting the acoustic signal, for example a microphone, is located on each target which has been fitted with a MILES. Targets can be vehicles, soldiers, buildings, etc. The microphone that detects the sound generated by the grenade is connected to receiver and identification circuitry. The output of the receiver is used as a trigger signal to momentarily remove the MILES power source from the rest of the MILES circuit. This results in the MILES audible alarm being activated.

The present invention is not limited to using a grenade. Various training devices, particularly ones that have variable-directional flight paths, can be designed to generate a predetermined audible signal simulative of an explosion. However, the present disclosure will primarily be directed towards the use of an audible grenade and its interaction with the simulator receiver circuitry.

BRIEF DESCRIPTION OF THE DRAWINGS

The foregoing and other objects, aspects, uses and advantages of the present invention will be mope fully appreciated as the same becomes better understood when considered in connection with the following detailed description of the present invention and in conjunction with the accompanying drawings, in which.

Figure 1:
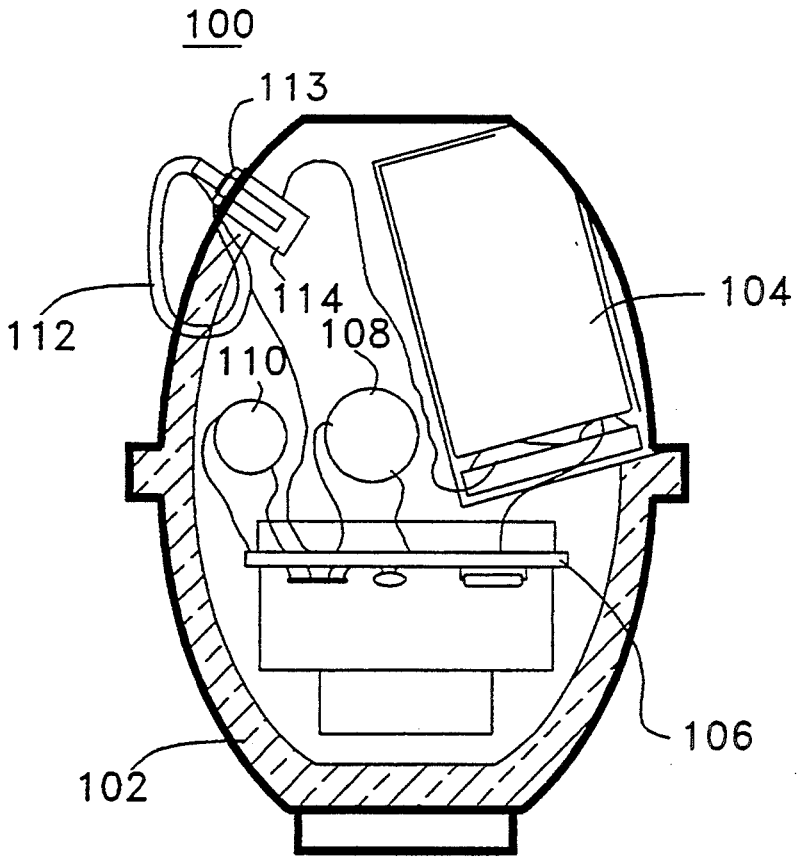
FIG. 1 shows a cross sectional view of a training grenade that can be used to generate an acoustic signal according to an aspect of the invention.

FIG. *2a* shows an electrical schematic diagram of an acoustically modulated training grenade as depicted in FIG. 1.

Figure 3:
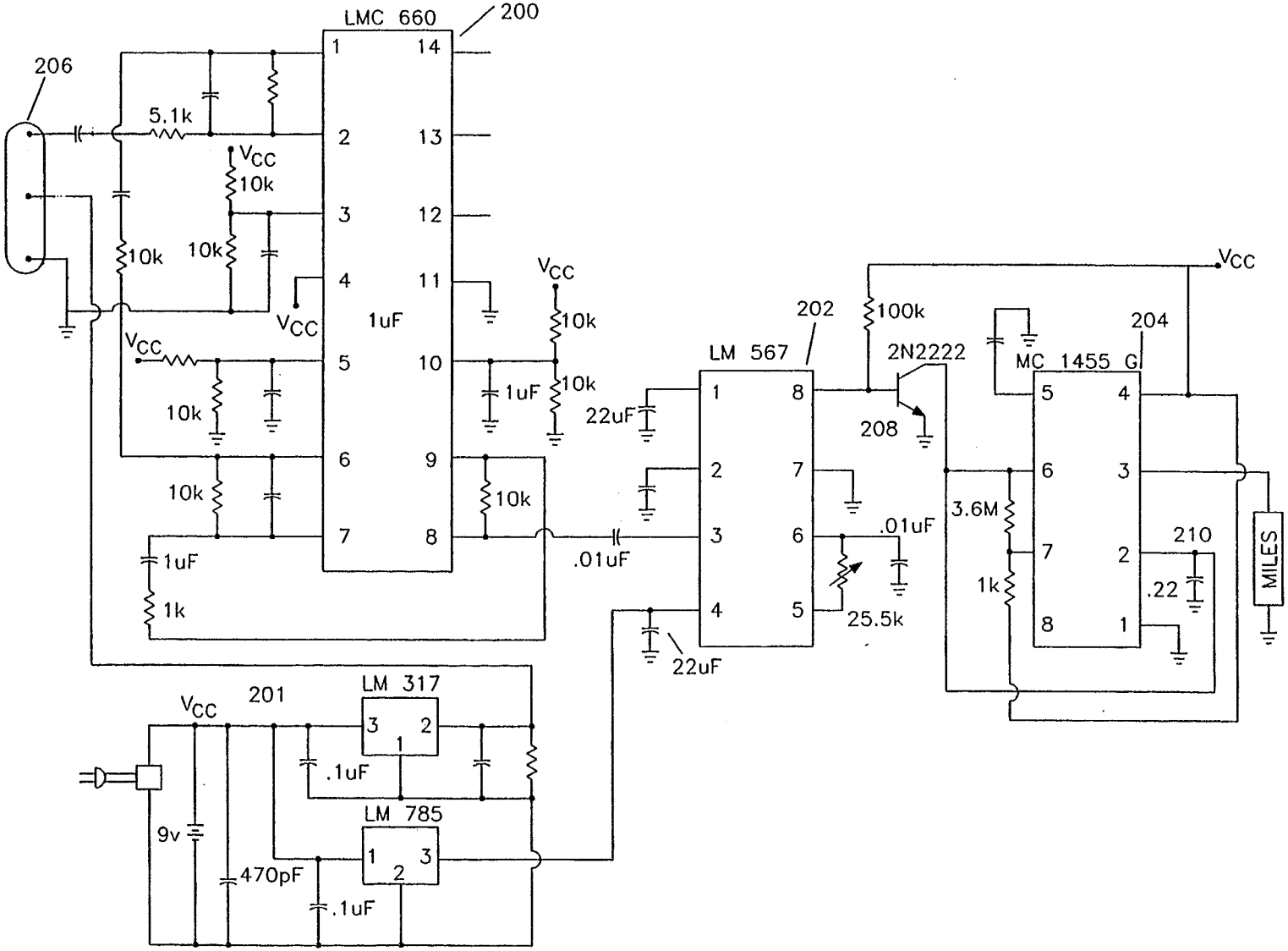

FIG. 3 shows an electrical schematic diagram of a basic embodiment of the receiver circuitry according to an aspect of the invention.

Figure 4:
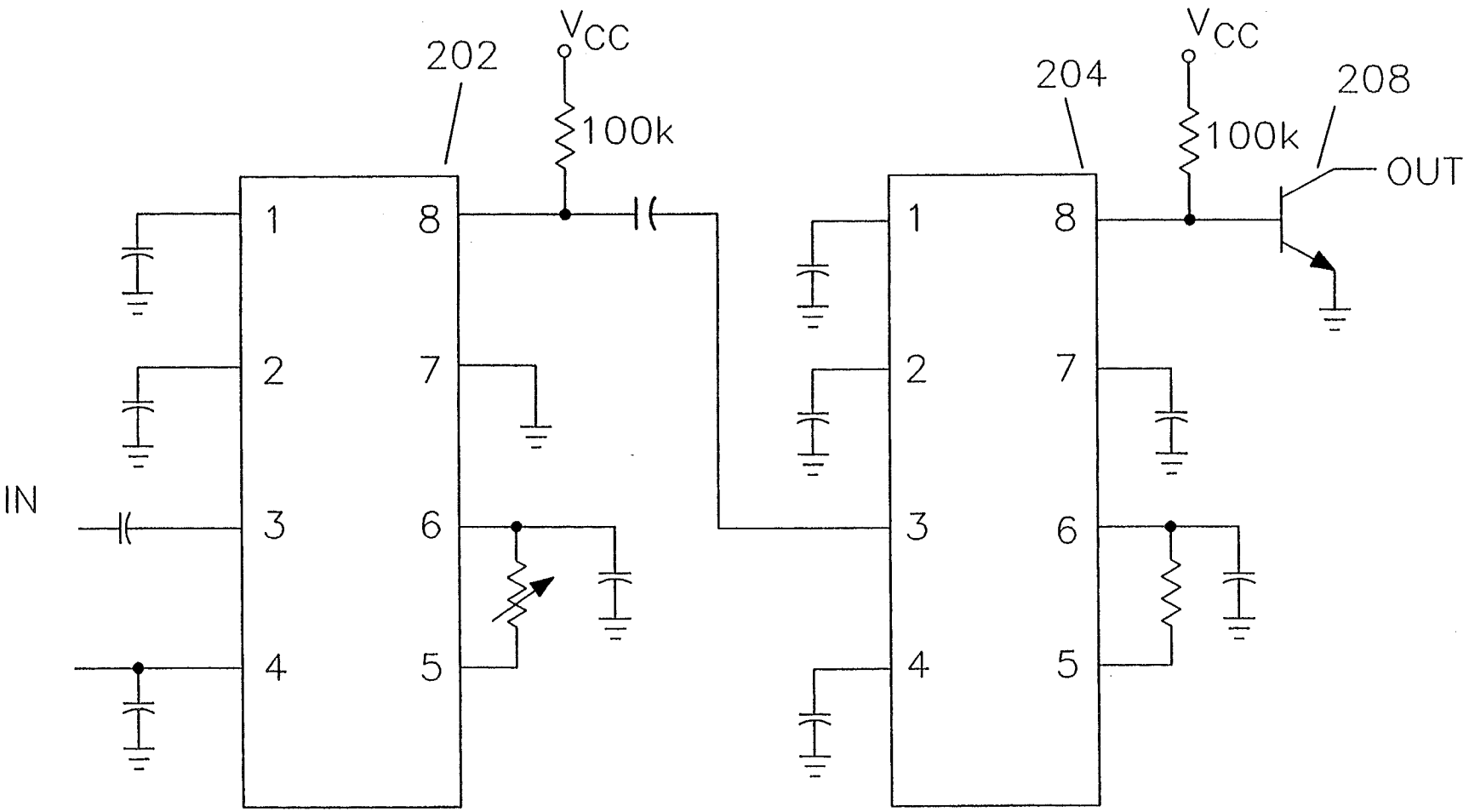

FIG. 4 shows a partial electrical schematic diagram of decoding circuitry as added to the circuitry as shown in FIG. 3.

DESCRIPTION OF THE PREFERRED EMBODIMENTS

Referring now to the drawings, like reference numerals represent identical or corresponding parts throughout the several views. Before a description is given on the receiver circuitry a description of an audible grenade of the type that can be used in the present invention will be described.

A cross sectional view of a grenade 100, having a barrel shape as used in many fragmentation grenades, is shown in FIG. 1. The housing 102 may be made from a transparent or translucent, synthetic, flexible or shock resistant material.

The housing material should be chosen so as to lessen the possibility of concussion or other types of injury in cases where the grenade 100 hits an unprotected player. A preferred material for this purpose is a polyurethane elastomer, such as that produced by the Dow Chemical Company of Midland, Mich., and known as Pellethane, Part No. 2103-70A. Pellethane has a Shore A durometer of 72 and a specific gravity of 1.06, making it a suitable choice for the housing 102. The grenade 100 contains a power supply or standard 9 volt battery 104 to power an electronic circuit mounted on circuit board 108 which fires a light emitting device 108 which then triggers a buzzer 110. Obviously, the grenade 100 need not be transparent nor translucent if a flash bulb is not used. If a flash bulb is used it illuminates the translucent housing 102 of the grenade 100. The light emitting device 108 could be, for example, a common type camera flash bulb such as a Sylvania Blue Dot, a light emitting diode, or a xenon flash beacon. Removing the pull ring 112 and safety pin 113 causes a phone type switch 114 to close, thereby providing power to the circuit.

Figure 2:
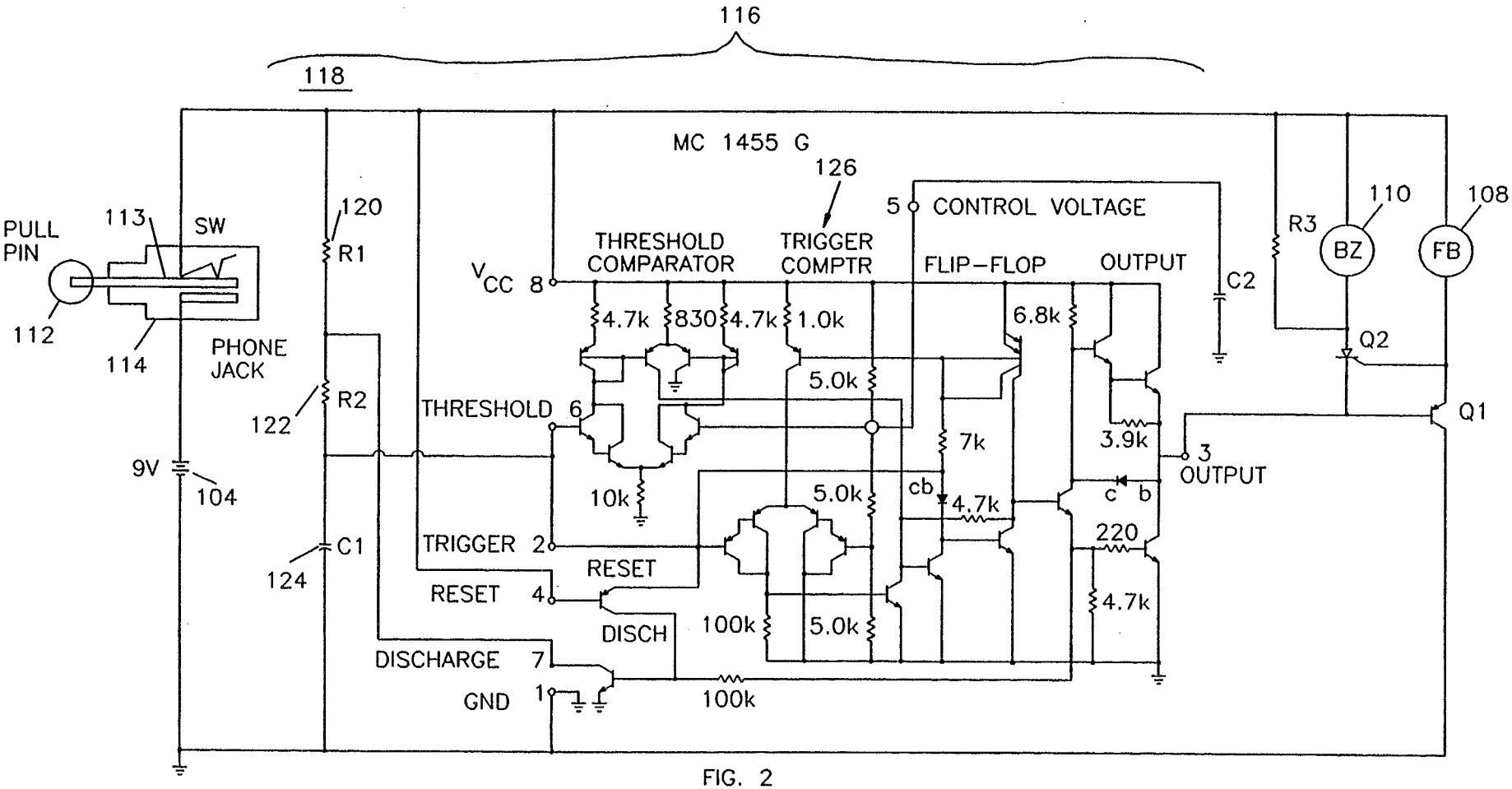
FIG. 2 shows an electrical schematic diagram of a training grenade as depicted in FIG. 1.

The electronic circuit mounted on circuit board 106 is shown in schematic form in FIG. 2 and comprises a phone type switch 114, a flash bulb 108, a bummer 110, and activation means 118. The activation means 118 comprises battery 104, a timing means 118 which may comprise a resistor 120 (R1), resistor 122 (R2) and capacitor 124 (C1) network, and a Motorola MC1455 monolithic timing circuit 128. Upon removal of the safety pin 113, by pulling on a safety pin pull ring 112, the switch 114, in series combination with battery 104, closes. The removal of the safety pin 113 starts the charging of timing means 118 within the activation means 118. After approximately a three second delay the flash bulb 108 is fired. This causes the buzzer 110 to sound for approximately three seconds thereby simulating the spread of fragments.

As mentioned previously, the acoustic signal may also be modulated at a predetermined frequency to further distinguish over the background noises associated with a training exercise. Of course, the unmodulated carrier signal must be of sufficient amplitude to be received without significant attenuation over a distance roughly corresponding to the "kill zone" of an actual explosive device. The practical limit in terms of human hearing would be about 120 dB. For a zone corresponding to the destructive of a conventional hand grenade, however, a signal of 75–80 dB at one meter is appropriate.

A modulated signal is generally preferred for purposes of reliability, as it allows the receiver circuitry to count pulses before indicating a hit. This cuts down on false hits and adds to the realism of the tactical simulation. Even where the receiver circuitry is tuned to a particular frequency and modulation scheme, it is sometimes possible for certain activities, such as starting an engine, to include the very same frequency components for a sustained period of time thereby exceeding predetermined receiver thresholds and indicating a false hit. For this reason, the carrier signal should be produced and modulated long enough for at least three pulses to be emitted. In fact, the receiver circuitry described in parent application, Ser. No. 07/691,603 looks for eight such pulses before it indicates a hit. Thus, current designs employ greater than eight pulses, with sixteen being preferred for purposes of reliability.

Since grenade fragments can be in transit anywhere from one to three seconds, sixteen pulses are easily emitted with a pulse-modulation rate of 50–100 milliseconds. Carrier frequencies are determined by the frequency of the crystal oscillator employed. A carrier frequency of 3750 Hz and a pulse rate of 69 msec have been implemented successfully and at minimum expense in connection with the receiver hereinafter described.

Figure 2A:
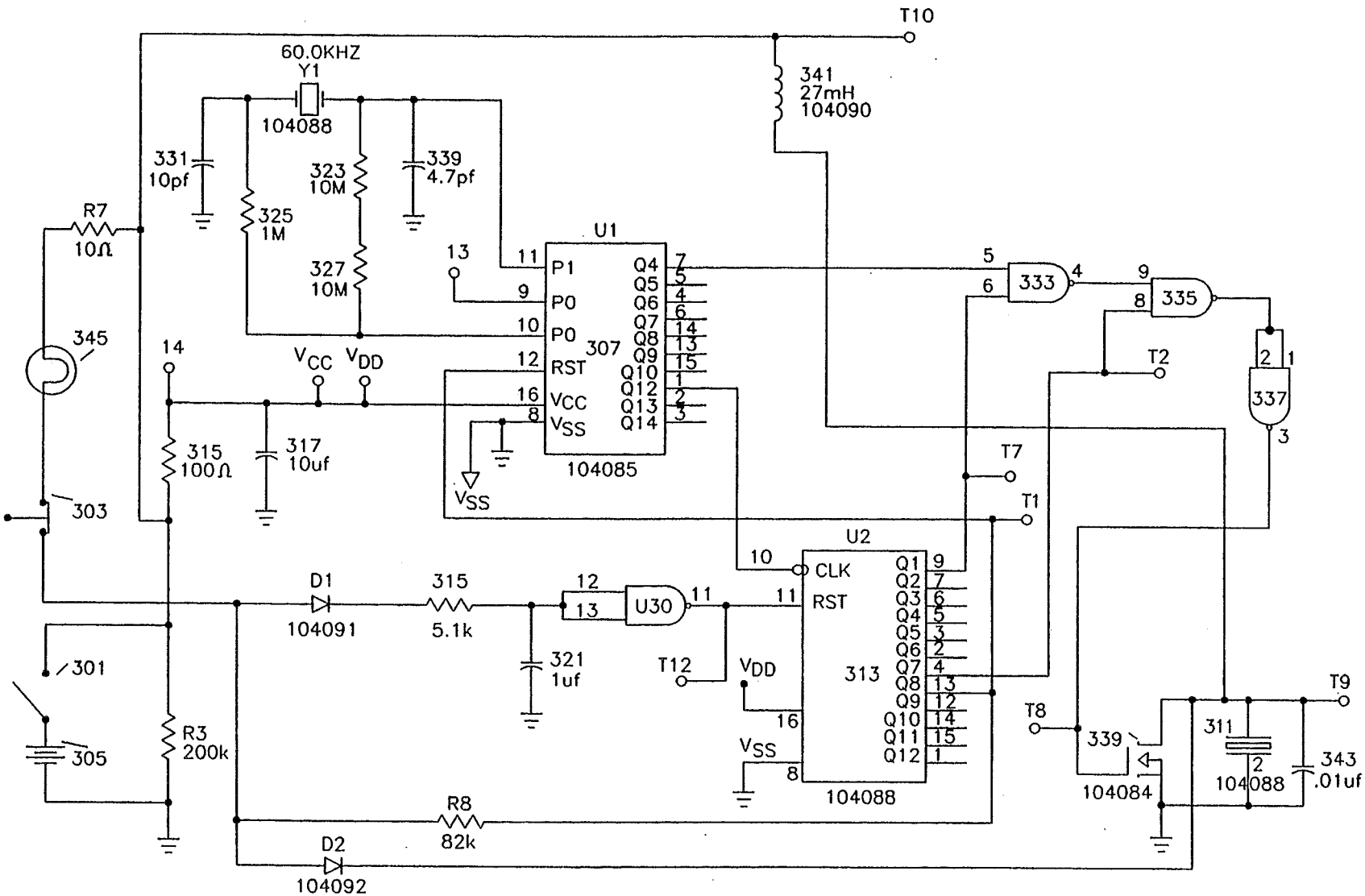

FIG. 2*a* illustrates an electronic circuit 300 mounted on circuit board 106 which implements a modulated acoustic signal in a grenade 100. Two switches 301 and 302 control grenade initiation. The start switch 301 connects the battery 305 to the balance of the circuit and may be activated by a pull-pin or some other means appropriate to the weapon being simulated. In the case of a grenade-like training device, the disable switch 303 is normally closed and must be manually held open to prevent the device from being activated. In a normal training sequence, the start switch 301 is activated via the pull-pin (not shown) and the disable switch 303 is activated shortly thereafter by releasing the push button (not shown). When the disable switch 303 is activated, binary counter 307 begins counting the clock pulses generated by the crystal oscillator 309. Binary counter 307 provides both the fundamental frequency (3750 Hz) for the transducer 311 and a clock frequency for the second binary counter 313. The second binary counter 313 provides the tone modulation frequency of 7.32 Hz, the control signal at 4.37 seconds which turns the transducer 311 on, and the control signal at 8.74 seconds which turns the transducer 311 off.

Resistor 315 and capacitor 317 filter the battery voltage and act as a buffer to isolate the timer circuit from the effect of the flashbulb load 345 on the battery 305. Resistor 319 and capacitor 321 provide a short delay between the release of the disable switch 303 and timer initiation. Capacitor 321 also prevents the timer 307 from being reset by the disable switch 303 once the timer 307 has started. Binary counter 307, a CD4060 with oscillator, is used in conjunction with components 323, 325, 327, 329, 331 and 309 to generate the fundamental (or carrier) frequency (3750 Hz) and to generate a clock signal for the second counter 313, a 12-stage binary counter. The second binary counter 313 provides the tone modulation signal as well as the time delays to start the tone modulation and to stop it.

NAND gate 333 "ands" the tone modulation signal with the 3750 Hz signal. NAND gate 335 "ands" the tone modulation start and stop signals with the tone modulation signal. NAND gate 337 is then used as an inverter to provide the proper polarity signal to N-type MOSFET 339.

When the disable switch 303 is released, the timer 307 begins after a short (approximately 5 millisecond) delay. The output of NAND gate 333 begins to switch after about 68 milliseconds and continues to change state at a 7.32 Hz rate. At about 4.37 seconds after the disabling switch 303 is released, the Q7 output of binary counter 313 goes high enabling NAND gate 335 to pass the tone modulation output of NAND gate 333 to MOSFET 339 via NAND inverter 337. The first time that the MOSFET 339 turns on it fires the flashbulb 345. The flashbulb filament vaporizes in microseconds so that the LC network (inductor 341, transducer 311 and capacitor 335) can be driven by MOSFET 339 almost immediately. Since the flashbulb 345 element is in series, the vaporization of the flash element creates an open circuit between the battery 305 and the start switch 301. This open circuit prevents the grenade 100 from being reused until the flashbulb 345 has been replaced. Thus preventing unauthorized and unfair use of the "spent" training device.

The tone modulation signal continues for a period of about 4.37 seconds. At the end of this time interval, the Q8 output of the second binary counter 313 goes high, resetting the first binary counter 307. When the first binary counter 307 resets, the oscillator portion of it is turned off so that the timer stops. Since the oscillator has stopped, Q8 of the second binary counter 313 remains high until the grenade pull pin is reinserted into the grenade 100, turning off power to the circuitry. When the timer and oscillator stop, the quiescent current drain on the battery 305 falls to a level determined by the leakage currents of the CMOS integrated circuits, the leakage currents of capacitor 317 and 321 and the current through resistor 347 and 349 (which are present to discharge capacitor 321 after the pull pin is reinserted into the grenade 100). The typical quiescent current drain is about 45 microamperes (9V/200K).

FIG. 3 shows a schematic of the receiver or MILES interface circuitry which comprises a quad operational amplifier (LMC 660) 200, a phase lock loop (LM 567) 202, a timer circuit (MC 1455G) 204, a microphone 200 and various discrete components. A rechargeable power section 201 provides voltage to the applicable circuitry. All of the functions performed by the receiver circuitry are accomplished using conventional, off the shelf, components with values shown as merely exemplary of an operational device.

When an acoustic signal is received from an acoustic training device, such as the grenade previously described, the signal is detected by the microphone 206. A conventional hearing aid may be used as the microphone 206. The output of the microphone 206 is fed to the quad amplifier 200. The quad amplifier 200 is configured as two cascaded bandpass filters followed by an active high pass filter. The filters are frequency adjusted to center around the emitting frequency of the acoustic training device and to amplify the microphone output. The output (pin 8) of the quad amplifier 200 is fed to the input (pin 3) of phase lock loop The phase lock loop 202 is configured as a narrow band tone detector. The output (pin 8) of the phase lock loop 202 goes low when a signal of the proper frequency is presented to the input (pin 3) of the phase lock loop 202. The output (pin 8) of the phase lock loop going low causes the base on transistor 208 to go low which allows capacitor 210 to charge. If the output (pin 8) of the phase lock loop 202 stays low long enough for capacitor 210 to charge beyond a set threshold, power supplied (by pin 3) to the MILES through timer 204 is removed. The MILES is thus supplied power through the output of timer 204 in place of the normal battery in the MILES. Power remains removed from the MILES until the acoustic signal is no longer received from the acoustic training device. When the acoustic signal is no longer being received power is restored to the MILES and its internal audible alarm is activated indicating a "hit" has taken place. Recall that the audible alarm is activated if the power to the MILES is momentarily removed and then reconnected.

Another embodiment of the present invention is shown in FIG. 4 and includes an additional phase lock loop 212. An additional phase lock loop provides for receiving coded pulse modulated signals transmitted from the acoustic training device. Only that portion of the circuit centered around the additional circuitry is shown. The remaining portion is identical as provided in FIG. 3.

The circuitry preceeding the input (pin 5) of phase lock loop 202 remains the same as shown in FIG. 3. The input signal comes from the quad amplifier 200. The output (pin 8) of phase lock loop 202 goes high and low at the pulse modulation Pate of the acoustic training device. A second phase lock loop 212 is inserted between phase lock loop 202 and transistor 208 and acts as a tone decoder that only locks on to a signal at the modulation frequency. The output (pin 8) of phase lock loop 212 goes low when an acoustic signal of the right frequency and modulation rate is received. The remaining portion of the circuit is identical and operates as that shown in FIG. 3.

Obviously, numerous modifications and variations of the present invention ape possible in light of the above teachings. It is therefore to be understood that within the scope of the appended claims, the invention may be practiced otherwise than as specifically described herein.

What is claimed is:

1. An acoustic training device for simulating the effects of an omnidirectional weapon in a tactical engagement simulation system employing acoustic receivers, said training device comprising:

a housing which resembles in size and shape the weapon to be simulated;

means disposed within said housing for generating an audible carrier signal of a particular frequency and duration;

means to modulate said audible carrier signal at a predetermined frequency, wherein said modulated signal is of sufficient amplitude to be detected by an acoustic receiver only within a range corresponding substantially to the kill-zone of the weapon to be simulated, and the duration of said signal is such that it can be distinguished from transient signals and noise;

means responsive to some external stimulus for activating said signal generating and modulating means.

2. An acoustic training device for simulating the effects of an omnidirectional weapon in a tactical engagement simulation system employing acoustic receivers, said training device comprising:

a housing which resembles in size and shape the weapon to be simulated;

means disposed within said housing for generating an audible carrier signal of a particular frequency and duration;

means to modulate said audible carrier signal at a predetermined frequency, wherein said modulated signal is of sufficient amplitude to be detected by an acoustic receiver only within a range corresponding substantially to the kill-zone of the weapon to be simulated, and the duration of said signal is such that at least three modulations of said carrier signal are emitted so that the pulse-modulated signal can be distinguished from transient acoustic signals and noise;

means responsive to some external stimulus for activating said signal generating and modulating means.

3. An acoustic training device for simulating the effects of an omnidirectional weapon in a tactical engagement simulation system employing acoustic receivers, said training device comprising:

a housing which resembles in size and shape the weapon to be simulated;

means disposed within said housing for generating an audible carrier signal of a particular frequency and duration;

means to modulate said audible carrier signal at a predetermined frequency, wherein the peak amplitude of said modulated signal is approximately 80 dB at one meter, and the duration of said signal is such that at least three modulations of said carrier signal are emitted so that said modulated audible carrier signal can be easily distinguished from transient signals and noise;

means responsive to some external stimulus for activating said signal generating and modulating means.

4. An acoustic training device for simulating the effects of an omnidirectional weapon in a tactical engagement simulation system employing acoustic receivers, said training device comprising:

a housing which resembles in size and shape the weapon to be simulated;

means disposed within said housing for generating an audible carrier signal of a particular frequency and duration;

means to modulate said audible carrier signal so as to produce a pulse-modulated signal having a period of between 50 and 100 milliseconds, wherein the peak amplitude of said modulated signal is approximately 80 dB at one meter, and the duration of said signal is 1–5 seconds so that at least three modulations of said carrier signal are emitted allowing the pulse-modulated signal to be easily distinguished from transient signals and noise;

means responsive to some external stimulus for activating said signal generating and modulating means.

5. The invention of any one of claims 1–4 wherein said audible signal generating and modulating means comprises a power source, timing means, and an acoustic transducer responsive to the output of said timing means, said timing means comprising two binary counters, the first of which provides a single-frequency fundamental carrier signal to said transducer, and the second of which provides a tone modulation signal of a different frequency and on/off control signals to said transducer.

6. The invention of claim 5 further comprising a plurality of NAND gates to logically combine said carrier frequency signal, tone modulation frequency signal, and on/off control signals into a single pulse-modulated signal of a particular duration.

* * * * *